US008654472B2

(12) United States Patent
Hall et al.

(10) Patent No.: US 8,654,472 B2
(45) Date of Patent: Feb. 18, 2014

(54) IMPLEMENTING ENHANCED FRAGMENTED STREAM HANDLING IN A SHINGLED DISK DRIVE

(75) Inventors: David Robison Hall, Rochester, MN (US); Jonathan Darrel Coker, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 168 days.

(21) Appl. No.: 13/306,260

(22) Filed: Nov. 29, 2011

(65) Prior Publication Data
US 2013/0135767 A1    May 30, 2013

(51) Int. Cl.
*G11B 5/02*    (2006.01)
(52) U.S. Cl.
USPC ............................................. 360/55; 360/66
(58) Field of Classification Search
USPC ............................. 360/55, 75, 58, 59, 60, 66
See application file for complete search history.

(56) References Cited

U.S. PATENT DOCUMENTS

| 2005/0071537 A1 | 3/2005 | New et al. |
| 2005/0086573 A1* | 4/2005 | Lambert et al. ............... 714/763 |
| 2007/0053658 A1* | 3/2007 | Murakami et al. .............. 386/95 |
| 2010/0027151 A1* | 2/2010 | Cromer et al. .................. 360/66 |

FOREIGN PATENT DOCUMENTS

| JP | 2007012139 A | 1/2007 |
| JP | 2007193883 A | 8/2007 |

OTHER PUBLICATIONS

"Indirection Systems for Shingled-Recording Disk Drives" by Yuval Cassuto et al., 2010 IEEE 26th Symposium on Mass Storage Systems and Technologies (MSST) May 2010, pp. 1-14.
"Design Issues for a Shingled Write Disk System" by Ahmed Amer et al., 2010 IEEE 26th Symposium on Mass Storage Systems and Technologies (MSST) May 2010, pp. 1-14.

* cited by examiner

*Primary Examiner* — Tan X Dinh
(74) *Attorney, Agent, or Firm* — Joan Pennington

(57) ABSTRACT

A method and a storage system are provided for implementing fragmented stream handling for persistent media including shingled disk drives (SDDs). A plurality of Exception Regions for recording stream commands is defined for disk regions. One state is maintained in each of the Exception Regions including a free Exception Region, an active Exception Region, a recovery Exception Region and a used Exception Region. TRIM commands are issued by a host to the drive to indicate deleted content.

20 Claims, 10 Drawing Sheets

400

TRIMMED 452    450

IMPLEMENTING ENHANCED FRAGMENTED STREAM HANDLING IN A SHINGLED DISK DRIVE

FIELD OF THE INVENTION

The present invention relates generally to the data storage field, and more particularly, relates to a method and apparatus for implementing fragmented stream handling for persistent media or hard disk drives (HDDs), such as a Shingled Disk Drive (SDD) using shingled perpendicular magnetic recording (SMR), or perpendicular magnetic recording (PMR).

DESCRIPTION OF THE RELATED ART

Hard disk drives used for many data processing applications require long-term data storage and typically a high-degree of data integrity. The hard disk drives (HDDs) advantageously include Shingled Disk Drives (SDDs) to achieve high track density using shingled perpendicular magnetic recording (SMR).

Hard disk drives used for consumer electronics (CE), such as including a digital video recorder (DVR) need to sustain a plurality of consecutive write streams under various conditions. Access patterns typically start as primarily long-block sequential writes, but may degrade to long-block host random writes as the storage system ages. Fragmentation is an issue in current systems with videos being continually created and deleted.

A need exists for an effective and efficient mechanism capable of sustaining a plurality of consecutive write streams under various conditions and implementing enhanced fragmented stream handling for persistent media or hard disk drives (HDDs). It is desirable to minimize changes to an overall SMR architecture, for example preferably including a run-time switch or region-by-region treatment.

SUMMARY OF THE INVENTION

Aspects of the present invention are to provide a method and a storage system for implementing fragmented stream handling for persistent media or disk drives. Other important aspects of the present invention are to provide such method and storage system substantially without negative effect and to overcome some of the disadvantages of prior art arrangements.

In brief, a method and a storage system are provided for implementing fragmented stream handling for persistent media including shingled disk drives. A plurality of Exception Regions for recording stream commands is defined for disk regions. Each of the Exception Regions is maintained in one state of a free Exception Region, an active Exception Region, a recovery Exception Region and a used Exception Region. TRIM commands are issued by a host to the drive to indicate deleted content.

BRIEF DESCRIPTION OF THE DRAWINGS

The present invention together with the above and other objects and advantages may best be understood from the following detailed description of the embodiments of the invention illustrated in the drawings, wherein.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the embodiments of the invention, a method and apparatus for implementing fragmented stream handling for persistent media or hard disk drives (HDDs), such as a Shingled Disk Drive (SDD) are provided.

In accordance with features of the embodiments of the invention, the enhanced fragmented stream handling is implemented using a TRIM command for deleted content together with associating groups of random commands with each other to be deleted together. As used in the description and claims, the term TRIM command should be understood to broadly include TRIM commands and other similar host commands to indicate deleted content.

Figure 1:
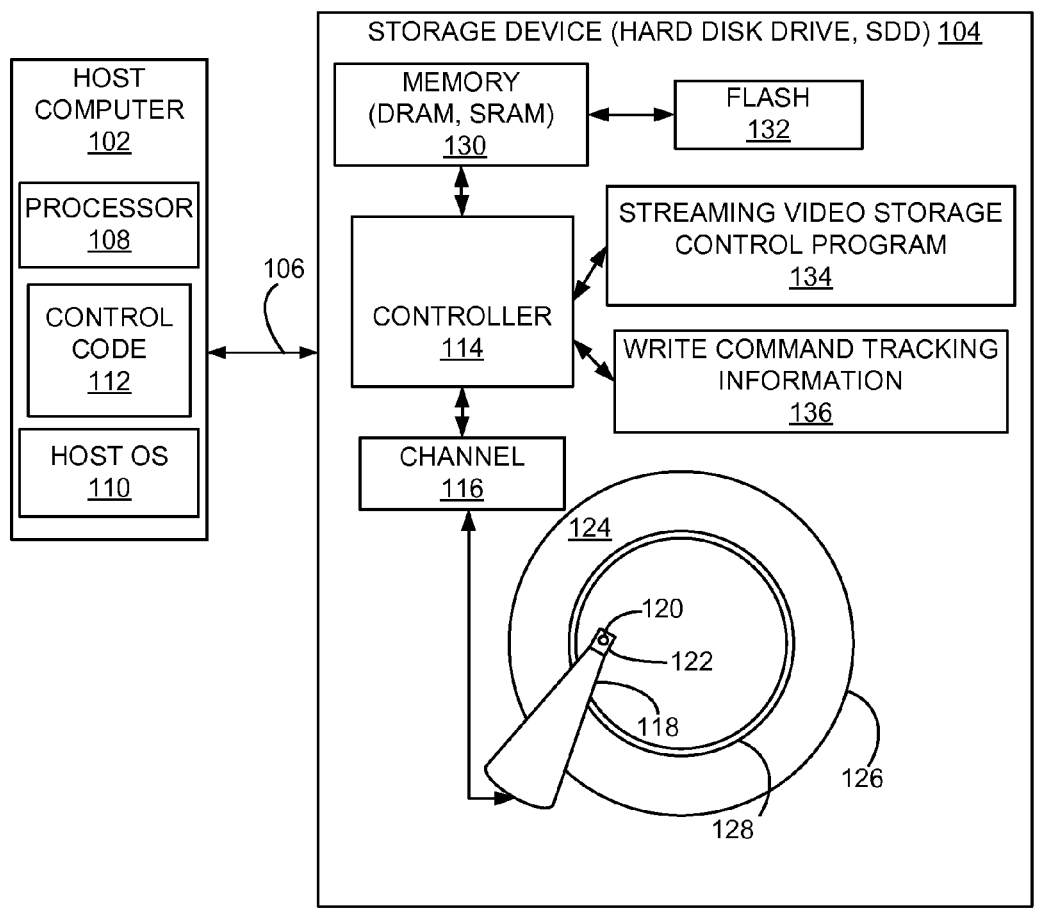
FIG. 1 is a block diagram representation of a system for implementing enhanced fragmented stream handling for persistent media or disk drives in accordance with an embodiment of the invention.

Having reference now to the drawings, in FIG. 1, there is shown an example system generally designated by the reference character 100 for implementing fragmented stream handling for persistent media or hard disk drives (HDDs) in accordance with an embodiment of the invention. System 100 includes a host computer 102, a storage device 104, and an interface 106 between the host computer 102 and the storage device 104.

The storage device or hard disk drive 104 preferably includes a Shingled Disk Drive (SDD) recording magnetic patterns of data on a writable disk surface 124 in overlapping circular tracks using shingled perpendicular magnetic recording (SMR).

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122.

Hard disk drive or Shingled Disk Drive (SDD) 104 includes a dynamic random access memory (DRAM) and/or a static random access memory (SRAM) 130 coupled to the controller 114 and a flash memory 132. Hard disk drive or 104 includes a streaming video storage control program 134 coupled to controller 114 used for implementing enhanced fragmented stream handling in accordance with the invention. Hard disk drive or SDD 104 includes write command tracking information 136 coupled to controller 114 used for implementing enhanced fragmented stream handling in accordance with the invention. The write command tracking information 136 describes the mapping of stream command LBAs from host to drive space for associating groups of written random commands with each other to be deleted together for issued TRIM commands for deleted content.

Controller 114 can include various implementations, for example, fabricated with one or multiple integrated circuit dies. A digital video recorder (DVR), a set-top-box (STB), or various other computer system types are specific implementations of a host computer 102. The control code 112 is shown in the host computer 102, and the controller 114 is shown in the hard disk drive 104 together with the streaming video storage control program 134 and the write command tracking information 136. It should be understood that the control code 112 may reside in any suitable location, such as the hard disk drive 104 separate from host computer 102 and the streaming video storage control program 134 and the write command tracking information 136 may reside in any suitable location, such as the host computer 102. It should be understood that the controller circuit 114 may reside in any suitable location, separate from hard disk drive 104, for example, in the host computer 102, and the like.

System 100 including the host computer 102 and the hard disk drive or SDD 104 is shown in simplified form sufficient for understanding the present invention. The illustrated host computer 102 together with the storage device or SDD 104 is not intended to imply architectural or functional limitations. The present invention can be used with various hardware implementations and systems and various other internal hardware devices.

Figure 2A:
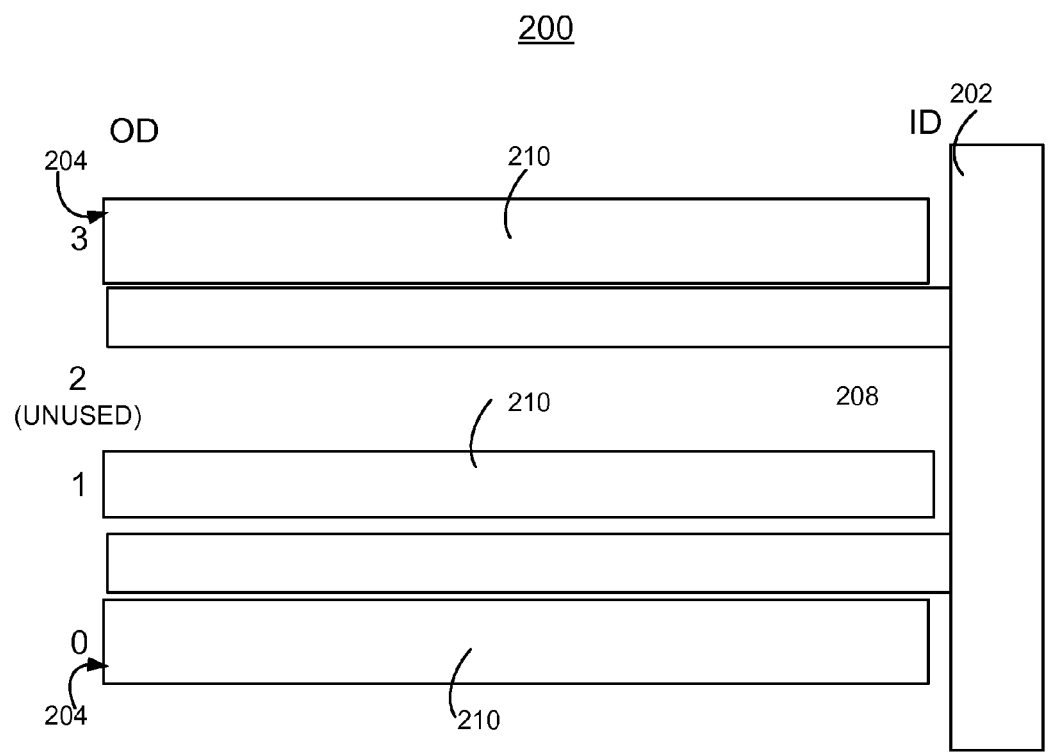
FIG. 2A schematically illustrates an example Shingled Disk Drive geometry including Exception Regions (E-Regions) for implementing enhanced fragmented stream handling in accordance with an embodiment of the invention.
Figure 2B:
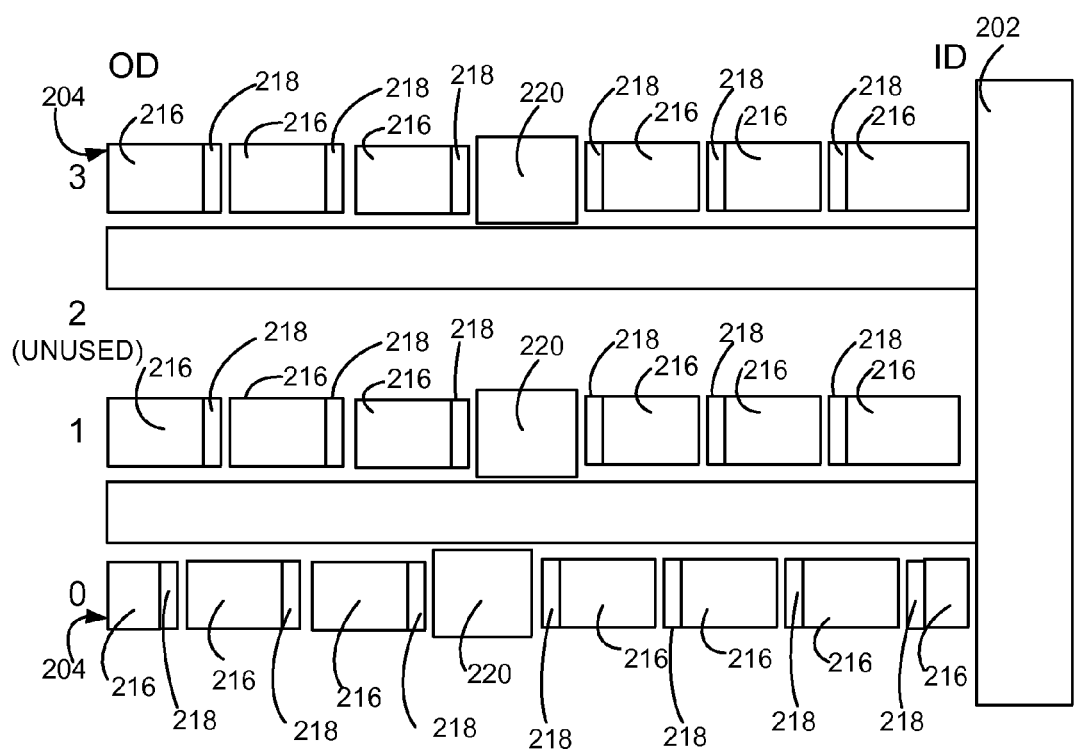
FIG. 2B schematically illustrates an example prior art SMR operation overview including I-track regions, Write twice cache, and Exception Regions (E-Regions) in an example prior art Shingled Disk Drive geometry.

Referring also to FIGS. 2A and 2B, there are shown a respective Shingled Disk Drive (SDD) geometry generally designated by the reference character 200 and in FIG. 2B a prior art example Shingled Disk Drive (SDD) geometry.

Referring to FIG. 2A, the illustrated Shingled Disk Drive geometry 200 is configured for implementing fragmented stream handling the SDD geometry including Exception Regions (E-Regions) 210 for implementing enhanced fragmented stream handling in accordance with an embodiment of the invention. The Shingled Disk Drive (SDD) geometry includes a spindle 202 proximate to an inner diameter (ID) of a disk including a plurality of tracks 204, #0-3. A plurality of one or more respective Exception Regions (E-Regions) 210 is disposed between the ID and an outer diameter (OD) of the plurality of tracks 204. The Exception Regions (E-Regions) 210 recording stream commands, without conversion to I-Region type of the traditional, prior art SMR algorithm.

As shown in FIG. 2B, the prior art SDD geometry similarly includes the spindle 202 proximate to an inner diameter (ID) of a disk including the plurality of tracks 204, #0-3. A plurality of I-track regions 216 together with a Write-Twice Cache 218 and an Exception Region (E-Region) 220 are disposed between the ID and an outer diameter (OD) of the illustrated prior art SDD geometry. In the prior art SDD geometry, an Indirection System and I-Track algorithm are based on rules and exceptions, where Indirection is the mapping of one block address space to another address space, for example, from host Logical Block Addresses (LBAs) to another block address space for persistent media, and I-Track is the Host and drive sequential set of Logical Block Addresses (LBAs), each of which may or may not be valid. The rule is the I-Track, a fixed-length set of host LBAs that is sequential in both host and drive space, which is located and processed in an I-Region, and metadata including a single drive start LBA. The exception is a single entry in the indirection system that describes the mapping of a contiguous sequence of LBAs from host to drive space. The exception is located in the Write-Twice Cache 218, or the Exception Region (E-Region) 220, with one of the Write-Twice Cache 218 or the E-Region 220 being the official location, and metadata consisting of a host start LBA, a length and a drive LBA. On each host read, a check is made to the indirection system to determine if all or part of the request is contained in one or more exceptions, and the request is assembled from one or more pieces and sent to the host.

In accordance with features of the embodiments of the invention, the enhanced fragmented stream handling is implemented to minimize changes to the overall SMR architecture. The enhanced fragmented stream handling method preferably is implemented on a region-by region basis or by a host defined storage range region for the new method of the invention or by a run-time switch in operation from conventional SMR operation.

In accordance with features of the embodiments of the invention, the enhanced fragmented stream handling is implemented keeping substantially all disk regions as E-Regions 210 with no conversion to I-Region type. Only E-Regions 210 are used and are maintained in one of four states including a free E-Region, an active E-Region, a recovery E-Region and used E-Region.

A TRIM command is designed to enable the operating system to notify the HDD of which pages of data are now invalid, for example, due to erases by the user or operating system. TRIM is a command name and is not an acronym. The TRIM command is used by controller 114 to identify groups of random commands for deleted content. During a delete operation the OS will send a TRIM command to the SDD or controller 114 with the associated LBAs to be marked as no longer valid. After that point the SSD or controller 114 knows not to relocate the group of random write commands tracked in the write command tracking information 136 corresponding to those host LBAs identified by the TRIM command during garbage collection or defragmentation.

In operation, host operating system 110 in host computer 102 sends write commands of streams to be written to hard disk drive 104. In response to the received commands, hard disk drive 104 writes random commands into active E-Regions on disk surface 124 in the order received and tracks the write commands in the write command tracking information 136 until trimmed. The write element 122 writes magnetic patterns of data on a recordable or writable surface 124 of a disk 126. Controller circuit 114 causes write element 122 to record magnetic patterns of data on a writable surface of disk 122 in overlapping circular tracks 128 using shingled writing, such as, shingled perpendicular magnetic recording (SMR), to achieve high track density. Controller circuit 114 causes write element 122 to write sequential commands into their own E-Region or dedicated active E-Region 210 and tracks the write commands in the write command tracking information 136 until trimmed.

Figure 3:
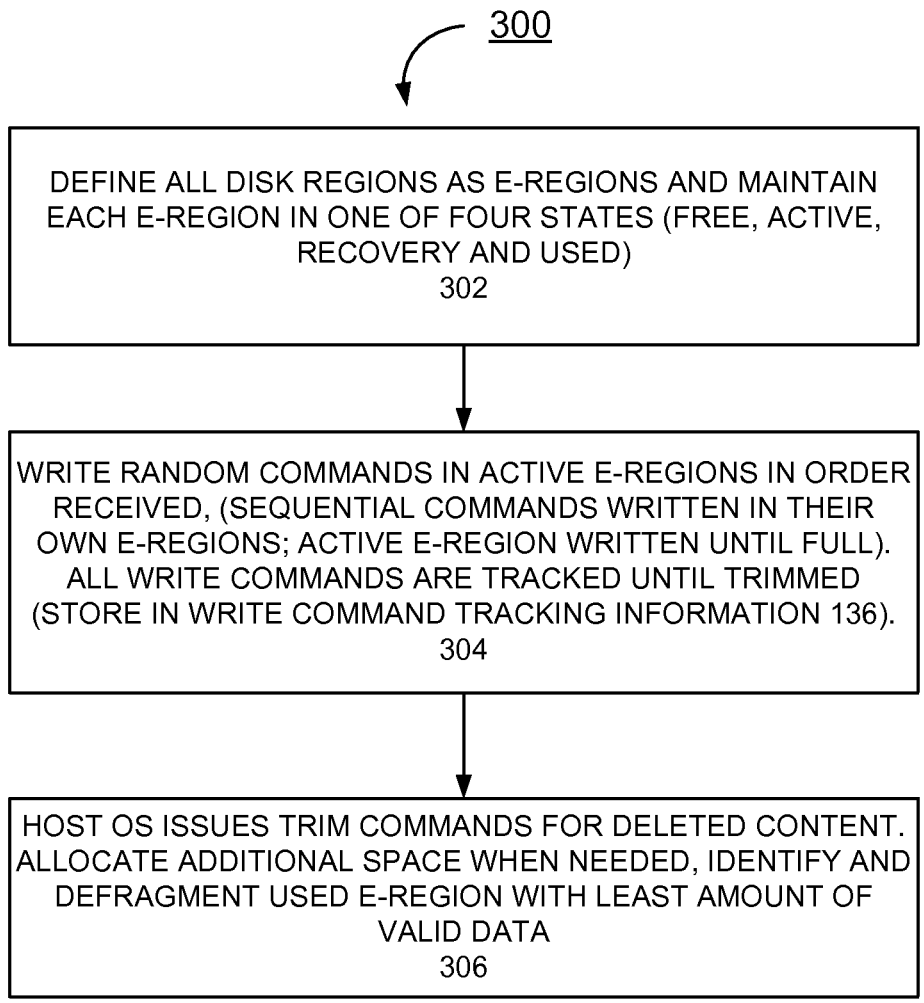
FIG. 3 is a flow chart illustrating example operations of the system of FIG. 1 for implementing fragmented stream handling for persistent media or disk drives in accordance with embodiments of the invention.

Referring to FIG. 3, example operations generally designated by the reference character 300 of the system 100 for implementing fragmented stream handling for persistent media or disk drives in accordance with embodiments of the invention. As indicated at a block 302, all disk regions are defined as E-Regions 210 and are maintained in one of four states including Free, Active, Recovery and Used. It is noted that existing firmware in prior art SMR architecture is capable of changing region types between I-Region and E-Region.

Random commands are written to active E-Regions 210 in the order received with sequential commands written in their own E-Region and the active E-Region is written until full as indicated at a block 304. In prior art SMR architecture, the I-Region is used to reduce Indirection system size. Every write command at block 304 needs to be tracked until Trimmed, for example, storing in write command tracking information 136.

As indicated at a block 306, TRIM commands are issued by the host OS for deleted content. As additional space is needed, the used E-Region with a least amount of valid data is identified and defragmented at block 306. The defragmentation is a compaction operation, which is a mechanism used to skip sparsely written I-Regions in prior art SMR architecture.

Figure 4A:
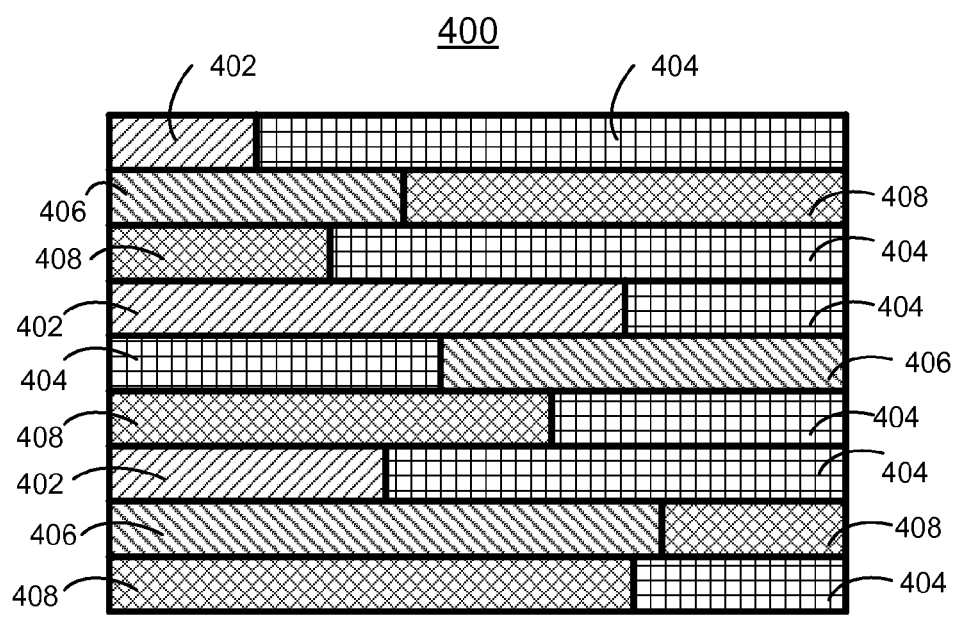
FIGS. 4A, and 4B are diagrams respectively illustrating example multiple N streams stored in an Exception Region (E-Region) and in FIG. 4B after a TRIM command used by the system of FIG. 1 deleting content and at least 1/Nth of the E-region freed for implementing fragmented stream handling in accordance with embodiments of the invention.
Figure 4B:
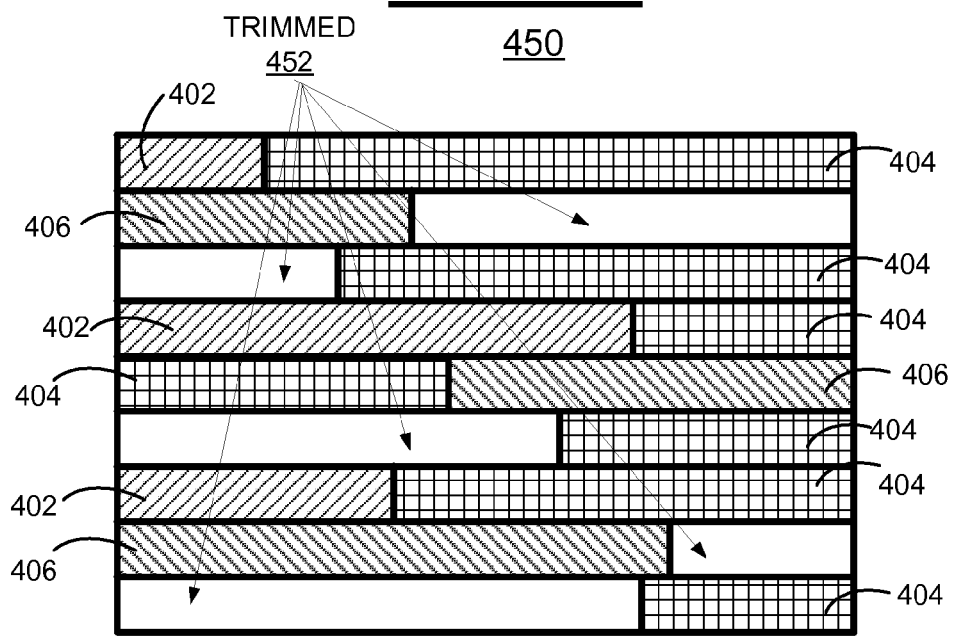

Referring also to FIGS. 4A, and 4B, there are shown respective example multiple N streams stored in an Exception Regions (E-Regions) generally designated by the reference character 400 and in FIG. 4B generally designated by the reference character 450 after a TRIM command being issued by the system 100 deleting content.

In FIG. 4A, the plurality of N streams include four streams 402, 404, 406, and 408 as shown, where N equals four streams as written in the E-Regions 400. Each of the streams 402, 404, 406, and 408 may include nonsequential host LBAs that are written sequentially to the disk.

For example, after the system deletes content with the TRIM command issued for a least valid region, at least one stream or about 1/Nth of the least valid E-region is freed during defragmentation for implementing enhanced fragmented stream handling in accordance with embodiments of the invention.

In FIG. 4B, trimmed portions generally designated by the reference character 452 indicate an issued TRIM command for deleting content of stream 408 during defragmentation, and in the illustrated example of the E-Regions 450 three streams 402, 404, 406 remain.

Figure 5:
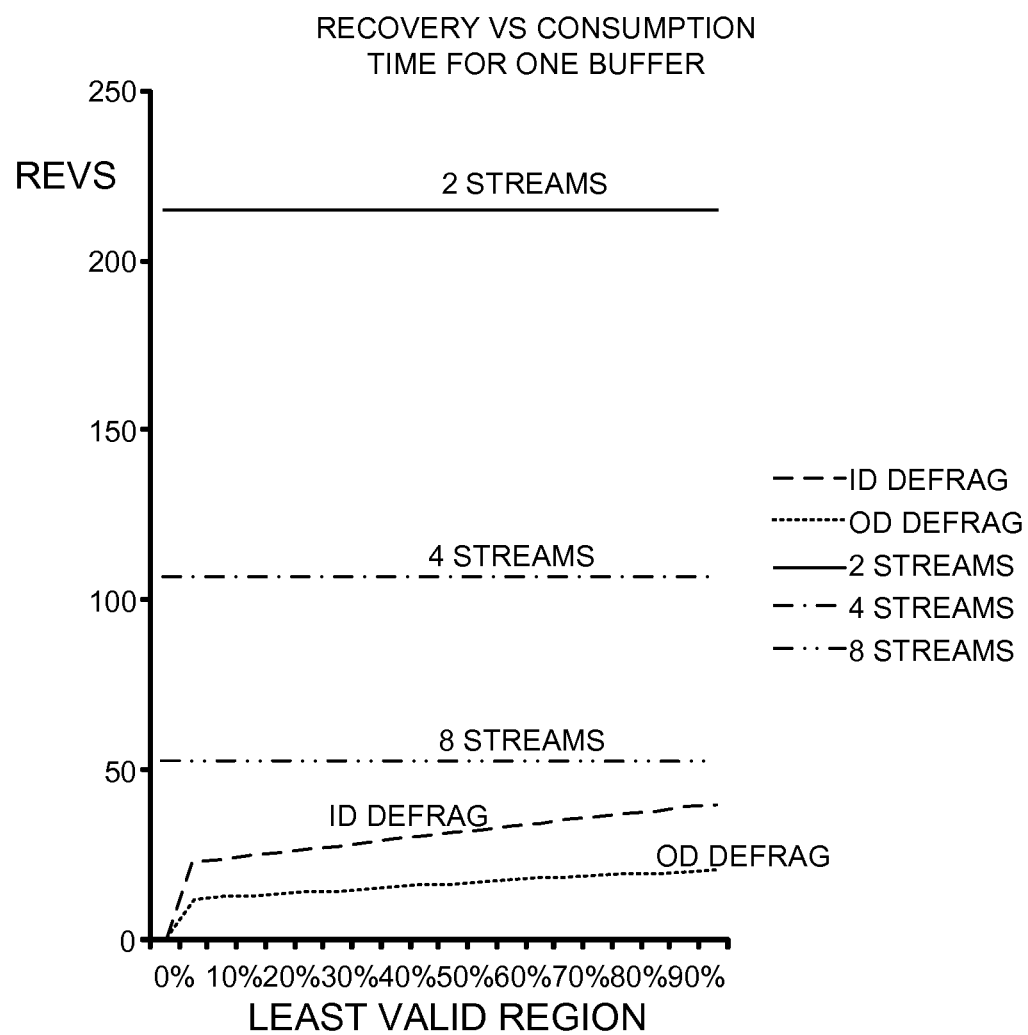
FIG. 5 is a diagram illustrating example recovery of least valid region versus consumption time for one buffer for multiple N streams in accordance with embodiments of the invention.

Referring also to FIG. 5, there is shown a diagram illustrating example recovery of least valid region versus consumption time for one buffer for multiple N streams in accordance with embodiments of the invention. In FIG. 5, revolutions are shown with respect to the vertical axis, and percentages of least valid region are shown with respect to the horizontal axis including ID Defrag, OD Defrag, 2 Streams, 4 Streams and 8 Streams. For example, defragmentation includes a seek to a used E-Region with a least amount of valid data or a least valid region that includes 1 revolution seek and ½ revolution latency, sequentially read of the target region to minimum buffer fill, and includes multiple revolutions for buffer fill at maximum validity. It should be understood that the buffer is not always filled and the recovery rate will be higher if some tracks can be skipped. Then a seek to a recovery E-Region includes 1 revolution seek and ½ revolution latency, then sequentially write the buffer. The write buffer time can be less than the read time, depending on validity. The recovery E-Region is distinct from the active E-Region where new streams are being written.

Figure 6:
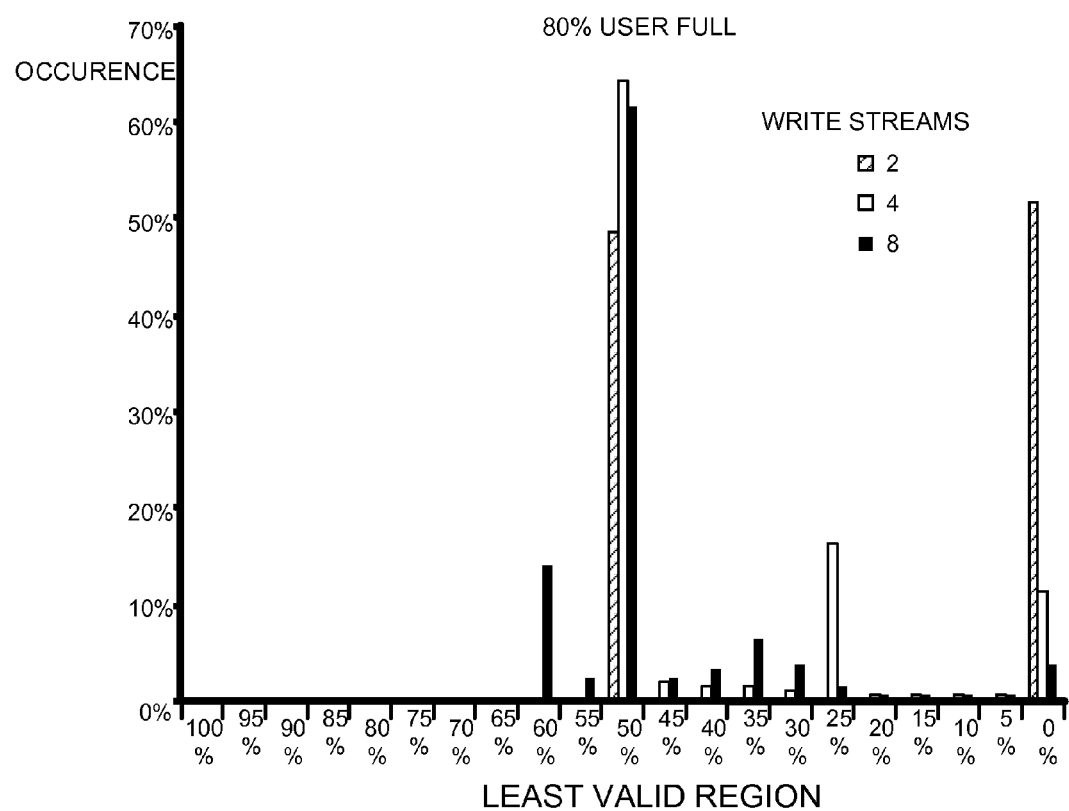
FIGS. 6, 7, and 8 are diagrams respectively illustrating example simulations of operations of the system of FIG. 1 for implementing fragmented stream handling in accordance with embodiments of the invention.
Figure 7:
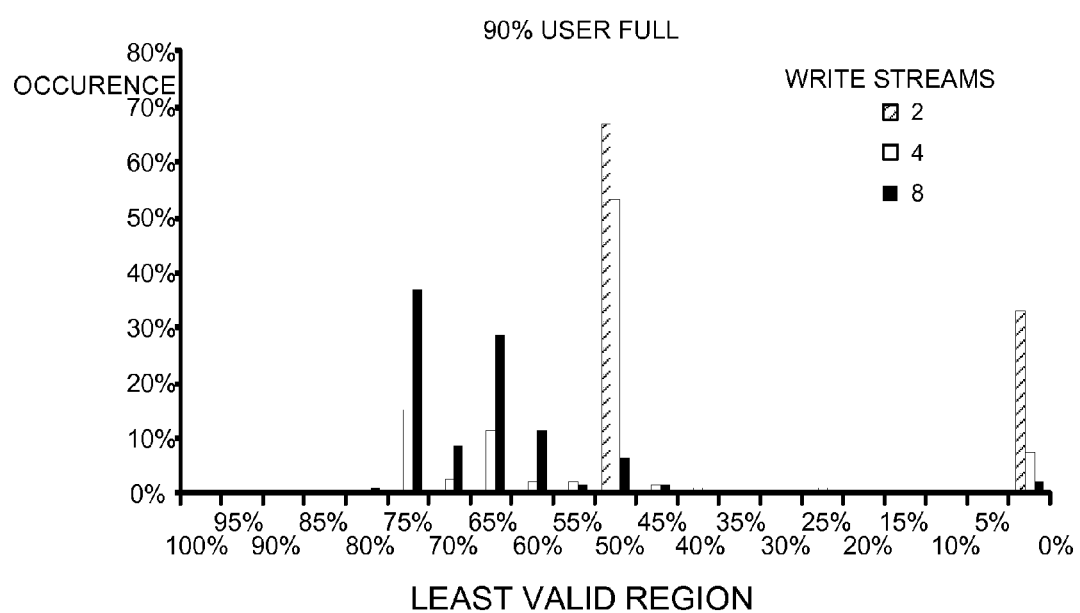
Figure 8:
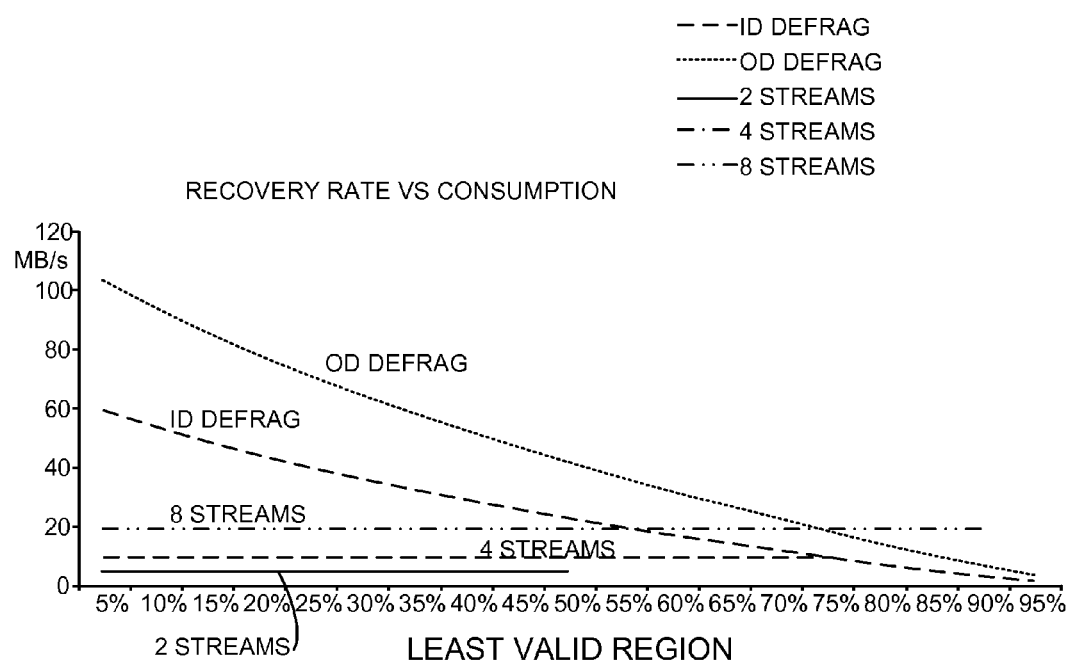

FIGS. 6, 7, and 8 are diagrams respectively illustrating example simulations of operations of the system 100 for implementing enhanced fragmented stream handling in accordance with embodiments of the invention. In FIGS. 6, 7, and 8 the simulated results are provided with a particular example drive configuration, for example, a 2 TB drive, 3% fixed E-Region (2% in extra E-Regions), 2, 4, and 8 Streams, 19.3 Mbps stream rate, Random stream deletion, 150 MB/s OD, 75 MB/s ID, 5940 RPM, 30-day, 24×7 runs, and 32 MB Customer Cache (exclusive of Indirection) with 14 MB Recovery Buffer, 10 MB Write Buffer, and 8 MB Reserved (Firmware use).

In FIGS. 6 and 7, Occurrence percentages are shown with respect to the vertical axis, and percentages of least valid region are shown with respect to the horizontal axis including 2, 4, and 8 Write Streams. FIG. 6 illustrates example simulations for 80% User Full and FIG. 7 illustrates example simulations for 90% User Full.

FIG. 8 illustrates example simulations of Recovery Rate vs. Consumption including ID Defrag, OD Defrag, 2 Streams, 4 Streams and 8 Streams. In FIG. 8 recovery rates in MB/s are shown with respect to the vertical axis and percentages of least valid region are shown with respect to the horizontal axis. As simulated, 2 Streams and 4 Streams support at 100% user capacity allocated, and 8 Stream support requires 80-85%. 8 Stream support is possible at 100% user capacity allocated where the average number of consecutive streams is lower than 8, with idle time, an increase in ID/OD rate with a fixed video rate; an increase in buffer size enabling more sequential defrag operations per seek/latency; with non-random deletion, and chronological is much more likely; or if large host sequential write to separate active E-regions.

In accordance with features of the embodiments of the invention, the enhanced fragmented stream handling enables sustaining a plurality of consecutive write streams under various conditions and, for example, guaranteeing a minimum of four high definition streams and up to approximately eight high definition streams concurrently under various conditions.

Figure 9:
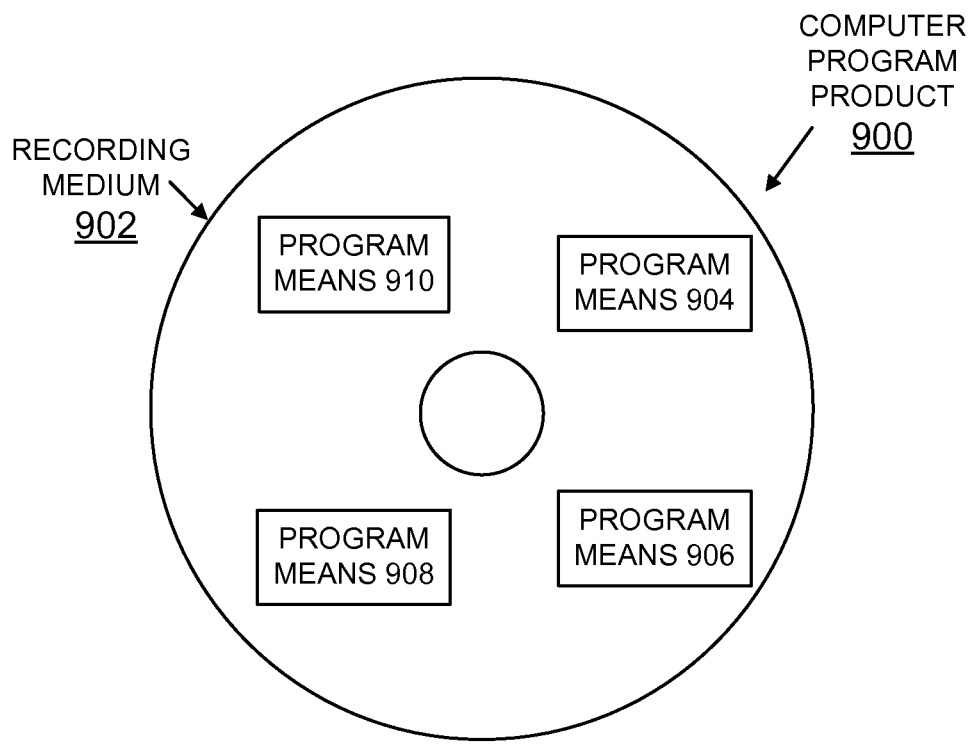
FIG. 9 is a block diagram illustrating a computer program product in accordance with embodiments of the invention.

Referring now to FIG. 9, an article of manufacture or a computer program product 900 of the invention is illustrated. The computer program product 900 includes a computer readable recording medium 902, such as, a floppy disk, a high capacity read only memory in the form of an optically read compact disk or CD-ROM, a tape, or another similar computer program product. Computer readable recording medium 902 stores program means or control code 904, 906, 908, 910 on the medium 902 for carrying out the methods for implementing enhanced fragmented stream handling of the embodiments of the invention in the system 100 of FIG. 1.

A sequence of program instructions or a logical assembly of one or more interrelated modules defined by the recorded program means or control code 904, 906, 908, 910, direct the system 100 for implementing enhanced fragmented stream handling methods of the embodiments of the invention.

While the present invention has been described with reference to the details of the embodiments of the invention shown in the drawing, these details are not intended to limit the scope of the invention as claimed in the appended claims.

What is claimed is:

1. A method for implementing fragmented stream handling for hard disk drive (HDD) persistent media comprising:
defining disk regions as a plurality of Exception Regions for recording stream commands;
maintaining each of the Exception Regions in one of a free Exception Region, an active Exception Region, a recovery Exception Region and a used Exception Region;
writing host random commands into active Exception Regions in a received order of the host random commands; and
issuing TRIM commands for deleted content of invalid information.

2. The method as recited in claim 1 wherein the hard disk drive (HDD) persistent media includes a controller performing the steps of defining disk regions, maintaining each of the Exception Region, and a host operating system issuing TRIM commands for deleted content for invalid data.

3. The method as recited in claim 1 wherein the persistent media hard disk drives (HDDs) includes a Shingled Disk Drive (SDD).

4. The method as recited in claim 1 wherein writing host random commands into active Exception Regions in a received order of the host random commands includes storing write command tracking information.

5. The method as recited in claim 4 includes writing sequential host commands into a dedicated active Exception Region.

6. The method as recited in claim 5 wherein writing sequential host commands into an active Exception Region includes the dedicated active Exception Region being written until substantially full.

7. The method as recited in claim 5 includes tracking write commands until defragmenting after TRIM commands for deleted content are issued.

8. The method as recited in claim 7 includes storing write command tracking information for each write command.

9. The method as recited in claim 1 wherein issuing TRIM commands for deleted content includes identifying a used Exception Region with a least amount of valid data and defragmenting said used Exception Region with the least amount of valid data.

10. The method as recited in claim 9 wherein defragmenting said used Exception Region with the least amount of valid data includes a compaction operation.

11. An apparatus for implementing fragmented stream handling for hard disk drive (HDD) persistent media comprising:
a plurality of Exception Regions for recording stream commands,
each of the Exception Regions being maintained in one of a free Exception Region, an active Exception Region, a recovery Exception Region and a used Exception Region;
host random commands being written into active Exception Regions in a received order of the host random commands; and
TRIM commands being issued by a host operating system for deleted content of invalid information.

12. The apparatus as recited in claim 11 wherein the hard disk drive (HDD) persistent media includes a Shingled Disk Drive.

13. The apparatus as recited in claim 11 includes a controller maintaining each of the Exception Regions in said one of said free Exception Region, said active Exception Region, said recovery Exception Region and said used Exception Region.

14. The apparatus as recited in claim 13 wherein said host operating system issuing said TRIM commands for deleted content of invalid information includes said controller identifying Exception Region with least amount of valid data.

15. The apparatus as recited in claim 14 includes said controller defragmenting said used Exception Region with the least amount of valid data.

16. The apparatus as recited in claim 11 wherein host random commands being written into active Exception Regions in a received order of the host random commands includes a controller writing host random commands into the active Exception Regions in the received order of the host random commands and storing write command tracking information.

17. The apparatus as recited in claim 16 includes said controller tracking write commands until defragmenting after TRIM commands for deleted content of invalid information are issued.

18. A data storage system comprising:
a persistent media;
a controller, and a write command tracking information coupled to said controller for implementing fragmented stream handling;
said controller defining disk regions as a plurality of Exception Regions for recording stream commands,
said controller maintaining each of the Exception Regions in one of a free Exception Region, an active Exception Region, a recovery Exception Region and a used Exception Region;
said controller writing host random commands into active Exception Regions in a received order of the host random commands; and
said controller identifying Exception Region with least amount of valid data for TRIM commands issued by a host operating system for deleted content of invalid information.

19. The data storage system as recited in claim 18 wherein said controller writing host random commands into active Exception Regions in a received order of the host random commands includes said controller storing write command tracking information.

20. The data storage system as recited in claim 18 includes said controller tracking write commands until defragmenting after TRIM commands for deleted content are issued.

* * * * *